March 22, 1938. C. P. BERGMAN 2,111,547
ACCURACY REGULATOR
Filed Jan. 5, 1937
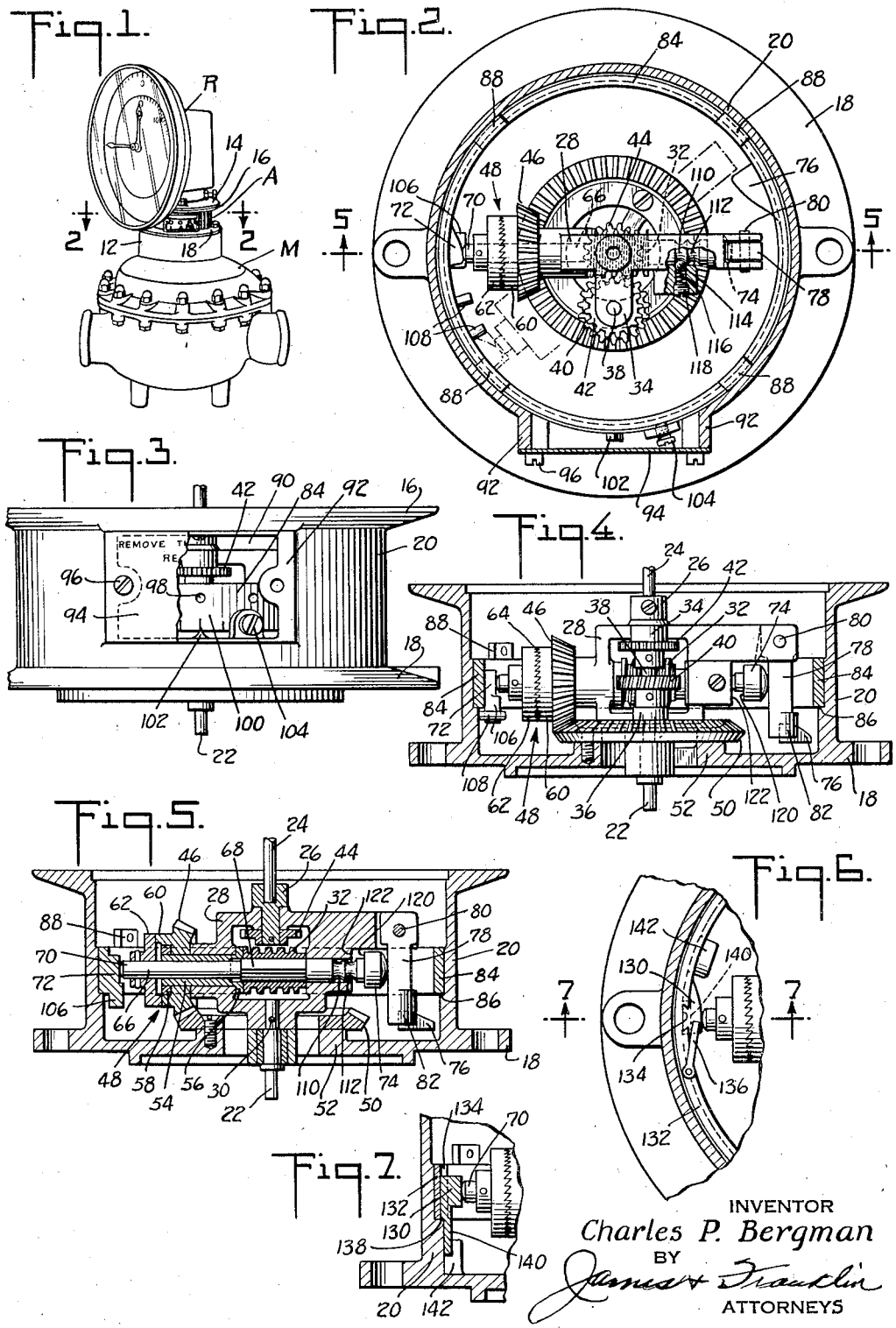
INVENTOR
Charles P. Bergman
BY
ATTORNEYS Patented Mar. 22, 1938

2,111,547

UNITED STATES PATENT OFFICE 2,111,547

ACCURACY REGULATOR

Charles P. Bergman, San Francisco, Calif., assignor to National Meter Company, Brooklyn, N. Y., a corporation of New York Application January 5, 1937, Serial No. 119,072

19 Claims. (Cl. 73—233)

This invention relates to an accuracy regulator, and more particularly to such a regulator intended for use directly between a fluid meter or like measuring device and a register which totalizes and indicates the reading of the meter.

Meters of conventional commercial type have a range of inaccuracy which may be excessive when measuring oil, gasoline or the like in contradistinction to an inexpensive fluid such as water. In my co-pending application Serial No. 734,626, filed July 11, 1934, I have disclosed an accuracy regulator of positive mechanical type which has proved to be highly successful and far superior to previous attempts at regulation, such as adjustable by-passes or the like.

The primary object of the present invention is to generally improve accuracy regulators of the positive mechanical type. A more particular object is to provide a regulator which will accommodate a large range of adjustment. With the present device it is readily possible to compensate for inaccuracy over a range of say 8%, which is far greater than the range heretofore obtainable. Another object is to retain or even increase the precision to which the meter may be regulated. An accuracy of one-tenth of one per cent is adequate for all practical purposes, and the present regulator readily produces this degree of accuracy, while using comparatively coarse working parts, and by greater refinement of construction, as will hereinafter appear, a far greater accuracy is obtainable.

Still another object resides in the provision of a worm and worm gear arrangement in the gear train of the mechanism in order to provide automatic self-locking between the meter shaft and the register shaft, so that in the event of failure of the regulating mechanism, the register will at worst read with the accuracy of the meter. The self-locking property of the worm and worm gear depends upon the irreversibility of the worm drive, and in accordance with the present invention a worm having a single thread of small pitch may be employed, thus bringing the threads of the worm nearly perpendicular to the worm axis and establishing a more perfect locking relation. In accordance with still another object of my invention, this desirable result may be enhanced by the provision of a special friction lock which functions to still further discourage any possible tendency toward creeping of the worm.

Further objects of my invention are to provide a large, easily read dial with widely spread divisions for indicating the position of adjustment of the regulator, and to place the dial markings about the periphery of a large-diameter ring which forms a part of the regulator mechanism.

To the accomplishment of the foregoing and other more particularized objects which will hereinafter appear, my invention consists in the meter, register and accuracy regulator elements and their relation one to the other, as hereinafter are more particularly described in the specification and sought to be defined in the claims. The specification is accompanied by a drawing in which:

Fig. 1 is a perspective view showing the manner in which the accuracy regulator of my invention is mounted between a meter and a register;

Fig. 2 is a horizontal section taken in the plane of the line 2—2 of Fig. 1, and shows the regulator mechanism in plan;

Fig. 3 is a front elevation of the regulator with a part of the cover plate removed;

Fig. 4 shows the regulator mechanism in elevation, one side of the casing being cut away;

Fig. 5 is a section through the regulator mechanism and is taken in the plane of the line 5—5 of Fig. 2;

Fig. 6 is a fragmentary view like Fig. 2, but showing a modification; and

Fig. 7 is a fragmentary elevation like Fig. 4, but showing a modification.

Referring to the drawing, and more particularly to Fig. 1, the accuracy regulator A is disposed directly between a meter M and a register R. The meter M may be of any desired type most suitable for the particular fluid being measured. The register R may be of the straight reading type using small number wheels instead of the large-face dial type shown. The top of the meter is provided with a circular seat 12, while the bottom of the register is provided with a circular flange 14 dimensioned to fit directly on seat 12. Ordinarily, the register is bolted directly to the meter. In accordance with the present invention the accuracy regulator A is provided with top and bottom flanges 16 and 18 which fit directly between the parts 14 and 12 so that no change in the conventional meter and register construction need be made.

The accuracy regulator is shown in greater detail in Figs. 2, 3, 4 and 5, and referring to these figures it will be seen that the regulator comprises an annular casing 20 terminating at the top and bottom in the flanges 16 and 18 previously referred to. The drive of the meter is applied to a bottom shaft 22 which for convenience will be referred to as the meter shaft. The output or drive from the regulator is applied to a top shaft 24 the lower end of which is received within and secured to a hub 26. Shaft 24 is the input shaft of the register and will therefore be referred to as the register shaft. Shafts 22 and 24 are preferably disposed in coaxial alignment and are most conveniently mounted concentrically with annular casing 20.

Shaft 22 is secured at its upper end to a rotatable frame 28, the parts being secured together by a pin 30, as is best shown in Fig. 5. The frame 28 carries a worm 32, the axis of which crosses the axis of shafts 22 and 24. Frame 28 is provided with sidewardly disposed upper and lower bearing arms 34 and 36 through which extends a vertical counter shaft 38. Worm 32 meshes directly with a worm gear 40 mounted on and secured to the lower end of counter shaft 38. A spur gear 42 is mounted on counter shaft 38 near its upper end, and this gear meshes with a spur gear 44 mounted in frame 28 coaxially with shafts 22 and 24, as is best shown in Fig. 5. Spur gear 44 is secured at the lower end of hub 26 and in effect is secured to the register shaft 24.

With the arrangement as so far described it will be seen that rotation of meter shaft 22 causes rotation of frame 28 together with worm 32, worm gear 40, and spur gears 42 and 44, thus imparting an equal rotation to register shaft 24. None of the gears in the gear train need rotate relative to frame 28, and the entire gear train may be said to be locked in stationary condition, thereby functioning to lock the meter shaft and the register shaft 24 directly together. It will be seen, however, that any rotation imparted to worm 32 will cause a movement of shaft 24 somewhat different from the movement of shaft 22, thereby affording correction for meter inaccuracy. In accordance with the present invention the desired correction is obtained by constantly rotating a clutch driving gear 46, thus forming a source of corrective motion. The rotation of gear 46 is, however, imparted to worm 32 only when a suitable clutch 48 is engaged, and this clutch is thrown into and out of engagement once during each revolution of the meter shaft 22. The duration of clutch engagement determines the degree of corrective movement applied to register shaft 24.

Considering the mechanism in greater detail, casing 20 has stationarily mounted thereon a large-diameter bevel gear 50, and a special annular seat 52 may conveniently be provided for receiving gear 50. Bevel gear 46 is freely rotatably mounted on frame 28, and is in constant mesh with bevel gear 50. Rotation of frame 28 is accompanied by rotation of gear 46. Referring to Fig. 5, it may be explained that gear 46 revolves on a bushing 54 received in cage 28. The inner end of bushing 54 is provided with a flange 56 which acts as a thrust bearing for one end of worm 32. The outer end of the bushing or sleeve 54 has secured thereto a collar 58 and gear 46 is held against axial movement by collar 58, the gear being freely rotatable, of course, on bushing 54.

Clutch 48 comprises a driving portion 60 and a driven portion 62. Driving portion 60 rotates with, and in the present case, is formed integrally with gear 46. The driving and driven portions of the clutch are provided on their adjacent faces with mating serrations 64, these serrations being faced in proper driving direction.

The driven part 62 of the clutch is mounted near one end of an axially reciprocable shaft 66. As is most clearly shown in Fig. 5, this shaft passes through sleeve 54 and through worm 32. The shaft is splined to the worm preferably by making the shaft square in section at 68. The worm is bored to mate with the square shaft. The worm and shaft rotate together, but the shaft may be moved axially without accompanying axial movement of the worm, the latter being held closely against axial movement. It will be seen that with this arrangement, the clutch may be engaged whenever the shaft is moved in one direction, and disengaged when the shaft is moved in opposite direction, and that when the clutch is disengaged the register shaft 24 rotates together with meter shaft 22, whereas when the clutch is engaged the shaft 24 has imparted thereto an additional movement caused by rotation of the worm, with concomitant rotation of the gear train 40, 42 and 44.

In order to reduce friction and to eliminate the necessity for a continuous cam, I prefer to employ separate throw-in and throw-out cams which need only be momentary in operation. For this purpose, I use both ends of shaft 66, the clutch being engaged whenever shaft end 70 passes throw-in cam 72 (see Fig. 2) and the clutch being disengaged whenever shaft end 74 passes throw-out cam 76. In order to prevent interference between the two cams they are preferably located at different levels, as will be manifest from inspection of Figs. 4 and 5. The rise of throw-out cam 76 is transferred to shaft end 74 through a lever 78, the upper end of which is pivoted on frame 28 at 80, and the lower end of which forms a cam follower 82 cooperating with throw-out cam 76. The intermediate part of lever 78 bears against the preferably rounded head of shaft end 74.

The corrective movement superimposed on the regular movement of shaft 22 depends upon the interval between throw-in cam 72 and throw-out cam 76, and manifestly, this interval should be adjustable. Only one of the cams need be movable for purposes of adjustment, and in the present case throw-out cam 76 is a stationary cam which may be cast integrally with casing 20, while throw-in cam 72 is movable, this cam preferably being mounted on a ring 84 received just inside the annular wall of casing 20. As will be seen from inspection of Figs. 4 and 5, the interior of casing 20 is shouldered at 86 to form a seat or bearing for ring 84, and after the ring has been slipped into the casing from above, it is held in place by a series of small bearing blocks 88, these blocks being detachably secured to the inner wall of the casing.

The side wall of casing 20 is preferably cut away to provide a window 90, the said window being bordered by an appropriate flange 92 on which a suitable cover plate 94 may be detachably mounted, as by means of screws 96. Window 90 is so located that when cover plate 94 is removed the outer periphery of ring 84 is exposed. The ring is provided with a series of holes 98 which act as capstan holes into which a suitable pin may be inserted for oscillating the ring. The exterior of ring 84 is employed as a dial or scale on which suitable markings or divisions 100 are engraved. A stationary pointer 102 forming a part of casing 20 cooperates with the scale 100 to indicate the position of the ring. Because of the large diameter of the ring the scale is large and the widely spread divisions are easily read. The ring may be locked in adjusted position by a suitable lock such as the lock screw 104.

Cam 72 may be moved about almost the entire periphery of the casing, thus providing a wide range of adjustment. However, cam 72 should not be brought into a position diametrically opposite cam 76, and to prevent this the ring 84 is provided with a depending stop member 106 located directly beneath cam 72, and casing 20 is provided with a pair of stop pins 108, located below ring 84 and diametrically opposite cam 76. The stop pins 108 limit the permissible movement of depending stop 106 and consequently of ring 84, to prevent cam 72 from being moved into a position diametrically opposite cam 76. Only a small fraction of the range of adjustment is lost, and this fraction is located at the extreme end of the range of adjustment and therefore is of no importance.

If desired, the clutch shaft may be provided with detent mechanism for holding the clutch in either engaged or disengaged position. Referring to Figs. 2 and 5, shaft 66 is provided with annular grooves 110 and 112. Frame 28 is bored to receive a detent ball 114 pressed toward shaft 66 by a spring 116 held by screw 118. Because of the spring pressure on ball 114, as well as the shape of cam grooves 110 and 112, the shaft is held in either of two positions, one corresponding to engagement of the clutch as shown in the drawing and the other corresponding to disengagement of the clutch.

Worm 32 may be given a fine pitch, and for all practical purposes is irreversible. Nevertheless, to help further guard against creeping of the worm, a friction brake may be provided which is made operative whenever the clutch is disengaged. Specifically, the outer end 74 of shaft 66 is enlarged, thus providing a face or shoulder 120. This face is so located that it bears against the mating end 122 of the frame when the clutch is disengaged. The friction faces 120 and 122 are held in engagement by reason of the spring detent previously described, for when ball 114 is pressed into groove 112, the friction faces come into engagement before the ball reaches the center of the groove.

To help illustrate the large range of adjustment obtainable with this arrangement, I may cite the specific case in which the worm and worm gear have a ratio of, say, 25 to 1. This high ratio is made possible by reason of the relatively rapid rotation of clutch driving gear 46. The high worm ratio is desirable in order to provide a good locking relation therebetween when the worm is not rotated. Assuming a bevel gear ratio between the stationary bevel gear 50 and the rotating bevel gear 46 of 2 to 1, the range of correction made possible is 2/25ths or 8%, of which all is available except the small fraction lost by reason of the stop pins 108 previously described. Now the precision or accuracy to which adjustment may be made depends upon the fineness of the clutch teeth. If these teeth are made relatively coarse, say if only 40 teeth are used, the accuracy of adjustment is the product of 1/40th times 1/25th, or 1/1000th, that is, $\frac{1}{10}$ of 1%, which is adequate for all practical purposes. By using a larger number of clutch teeth, say 100, a still greater precision is readily obtained.

In Figs. 6 and 7, I show a modified way to prevent opposition between the throw-in and throw-out cams 72 and 76. Referring to these figures, it will be seen that the throw-in cam 130 is vertically reciprocably mounted on adjusting ring 132 by means of a dovetail connection 134. The cam is normally held in downward position by a small leaf spring 136, the downward movement being limited by an appropriate stop shoulder 138. Cam 130 carries a depending abutment 140 dimensioned to cooperate with the stationary cam 142 cast integrally with casing 20. Stationary cam 142 is located diametrically opposite the stationary throw-out cam 76 previously described. With this arrangement the adjusting ring 132 may be turned in either direction as far as desired, and throw-in cam 130 may be moved directly opposite the throw-out cam, but at such time the cam 142 functions to elevate the throw-in cam 130 to a position above the end 70 of shaft 66. The clutch then remains disengaged, and in a sense the throw-out cam may be said to remain effective while the throw-in cam is made ineffective.

It is believed that the construction and operation of my improved accuracy regulator, as well as the many advantages thereof, will be apparent from the foregoing detailed description thereof. This regulator has a large range of adjustment, together with a fine degree of adjustment. The worm is a simple, single-thread worm of high ratio and is almost perfectly irreversible. The clutch may be provided with relatively coarse teeth. The parts are therefore economical to manufacture. A large scale dial with widely spread divisions is obtained, and the dial is provided directly on the adjusting ring without necessitating a special dial ring. No pawl and ratchet mechanism is required, and the complete assembly is compact in dimension.

It will be apparent that while I have shown and described my invention in preferred forms, many changes and modifications may be made in the structures disclosed without departing from the spirit of the invention defined in the following claims.

I claim:

1. An accuracy regulator for forming an operative drive connection between the rotating shaft of a meter and the aligned rotatable shaft of a register where the meter has a range of inaccuracy for which correction is desired, comprising a worm rotatable on an axis intersecting the axis of the meter shaft, a gear train including said worm bodily rotatable with the meter shaft for equally rotating the register shaft while the gear train is in locked condition, means to impart intermittent movement to the worm in order to modify the movement of the register shaft relative to the movement of the meter shaft, and means to adjust the extent of movement of the worm produced by the last mentioned means.

2. An accuracy regulator for forming an operative drive connection between the rotating shaft of a meter and the rotatable shaft of a register where the meter has a range of inaccuracy for which correction is desired, comprising a stationary gear, a gear train bodily rotatable with the meter shaft for rotating the register shaft, a planet gear revolved by the meter shaft and meshing with the aforesaid stationary gear in order to impart continuous rotation to said planet gear, clutch mechanism whereby said planet gear may be connected to or disconnected from a gear in the aforesaid gear train in order to modify the movement of the register shaft relative to the movement of the meter shaft, and adjustable means for causing engagement and disengagement of the clutch mechanism during a part of each revolution of the meter shaft.

3. An accuracy regulator for forming an operative drive connection between the rotating shaft of a meter and the rotatable shaft of a register where the meter has a range of inaccuracy for which correction is desired, comprising a stationary gear, a gear train including a worm and worm gear and bodily rotatable with the meter shaft for rotating the register shaft, a planet gear revolved by the meter shaft and meshing with the aforesaid stationary gear in order to impart continuous rotation to said planet gear, clutch mechanism whereby said planet gear may be connected to or disconnected from the worm in the aforesaid gear train in order to modify the movement of the register shaft relative to the movement of the meter shaft, and adjustable means for causing engagement and disengagement of the clutch mechanism during a part of each revolution of the meter shaft.

4. An accuracy regulator for forming an operative drive connection between the rotating shaft of a meter and the aligned rotatable shaft of a register where the meter has a range of inaccuracy for which correction is desired, comprising a stationary gear concentric with the meter shaft, a gear train including a worm and worm gear and bodily rotatable with the meter shaft for equally rotating the register shaft, a planet gear revolved by the meter shaft and meshing with the aforesaid stationary gear in order to impart continuous rotation to said planet gear, clutch mechanism whereby said planet gear may be connected to or disconnected from the worm in the aforesaid gear train in order to modify the movement of the register shaft relative to the movement of the meter shaft, and adjustable cam means for causing engagement and disengagement of the clutch mechanism during a part of each revolution of the meter shaft.

5. An accuracy regulator for forming an operative drive connection between the rotating shaft of a meter and the rotatable shaft of a register where the meter has a range of inaccuray for which correction is desired, comprising a stationary gear concentric with the meter shaft, a gear train bodily rotatable with the meter shaft for rotating the register shaft, a planet gear revolved by the meter shaft and meshing with the aforesaid stationary gear in order to impart continuous rotation to said planet gear, clutch mechanism whereby said planet gear may be connected to or disconnected from a gear in the aforesaid gear train in order to modify the movement of the register shaft relative to the movement of the meter shaft, a throw-in cam for engaging said clutch mechanism, a throw-out cam for disengaging said clutch mechanism, one of said cams being stationarily mounted and the other of said cams being adjustable about the meter shaft.

6. An accuracy regulator for forming an operative drive connection between the rotating shaft of a meter and the rotatable shaft of a register where the meter has a range of inaccuracy for which correction is desired, comprising a stationary gear concentric with the meter shaft, a gear train bodily rotatable with the meter shaft for rotating the register shaft, a planet gear revolved by the meter shaft and meshing with the aforesaid stationary gear in order to impart continuous rotation to said planet gear, clutch mechanism whereby said planet gear may be connected to or disconnected from a gear in the aforesaid gear train in order to modify the movement of the register shaft relative to the movement of the meter shaft, a throw-in cam for engaging said clutch mechanism, a throw-out cam for disengaging said clutch mechanism, one of said cams being stationarily mounted and the other of said cams being mounted on a ring adjustable about the meter shaft, and a scale on said ring cooperating with a stationary pointer for indicating the position of the adjustable cam.

7. An accuracy regulator for forming an operative drive connection between the rotating shaft of a meter and the rotatable shaft of a register where the meter has a range of inaccuracy for which correction is desired, comprising a stationary gear concentric with the meter shaft, a gear train including a worm and worm gear and bodily rotatable with the meter shaft for equally rotating the register shaft, a planet gear revolved by the meter shaft and meshing with the aforesaid stationary gear in order to impart continuous rotation to said planet gear, clutch mechanism whereby said planet gear may be connected to or disconnected from the worm in the aforesaid gear train in order to modify the movement of the register shaft relative to the movement of the meter shaft, a throw-in cam for engaging said clutch mechanism, a throw-out cam for disengaging said clutch mechanism, one of said cams being stationarily mounted and the other of said cams being mounted on a ring adjustable about the meter shaft, and locking means for locking the ring in adjusted position.

8. An accuracy regulator for forming an operative drive connection between the rotating shaft of a meter and the rotatable shaft of a register where the meter has a range of inaccuracy for which correction is desired, comprising a stationary gear concentric with the meter shaft, a gear train including a worm and worm gear and bodily rotatable with the meter shaft for rotating the register shaft, a planet gear revolved by the meter shaft and meshing with the aforesaid stationary gear in order to impart continuous rotation to said planet gear, clutch mechanism whereby said planet gear may be connected to or disconnected from the worm in the aforesaid gear train in order to modify the movement of the register shaft relative to the movement of the meter shaft, a throw-in cam for engaging said clutch mechanism, a throw-out cam for disengaging said clutch mechanism, one of said cams being stationarily mounted and the other of said cams being mounted on a ring adjustable about the meter shaft, a scale on said ring cooperating with a stationary pointer for indicating the position of the adjustable cam, and locking means for locking the ring in adjusted position.

9. An accuracy regulator for forming an operative drive connection between the rotating shaft of a meter and the rotatable shaft of a register where the meter has a range of inaccuracy for which correction is desired, comprising a frame rotatable with the meter shaft, a worm carried in said frame, a worm gear meshing with said worm and carried in said frame, spur gears connecting the worm gear to the register shaft, a clutch shaft extending through and rotatable with said worm, a stationary bevel gear fixedly mounted concentric with the meter shaft, a clutch bevel gear meshing with said stationary bevel gear and carried by the aforesaid frame whereby said clutch bevel gear rotates constantly as the frame revolves relative to the stationary bevel gear, a clutch including a driving portion secured to said bevel gear and a driven portion secured to the aforesaid clutch shaft, said portions being engaged when the clutch shaft is moved in one direction and disengaged when the clutch shaft is moved in opposite direction, and adjustable cam means to vary the portion of each rotation of the meter shaft during which the clutch is engaged.

10. An accuracy regulator for forming an operative drive connection between the rotating shaft of a meter and the aligned rotatable shaft of a register where the meter has a range of inaccuracy for which correction is desired, comprising a frame rotatable with the meter shaft, a worm carried in said frame, a worm gear meshing with said worm and carried in said frame, spur gears connecting the worm gear to the register shaft, a clutch shaft extending through and rotatable with said worm, a stationary bevel gear fixedly mounted concentric with the meter shaft, a clutch bevel gear meshing with said stationary bevel gear and carried by the aforesaid frame whereby said clutch bevel gear rotates constantly as the frame revolves relative to the stationary bevel gear, a clutch including a driving portion secured to said bevel gear and a driven portion secured to the aforesaid clutch shaft, said portions being engaged when the clutch shaft is moved in one direction and disengaged when the clutch shaft is moved in opposite direction, a throw-in cam for causing engagement of the clutch and a throw-out cam for causing disengagement of the clutch, said cams being relatively adjustable in position in order to vary the portion of each rotation of the meter shaft during which the clutch is engaged.

11. An accuracy regulator for forming an operative drive connection between the rotating shaft of a meter and a register where the meter has a range of inaccuracy for which correction is desired, comprising a generally annular casing having an open bottom end adapted to mate with the top of the meter body and an open top end adapted to mate with the bottom of a register, vertical input and output shafts arranged in alignment with one another, a frame on said input shaft, a worm and worm gear carried by said frame, spur gears for connecting the worm gear to the output shaft, a stationary bevel gear fixedly secured to said casing, a planet bevel gear carried by and freely rotatable on said frame and meshing with the aforesaid stationary bevel gear, a clutch having a driving portion connected to said planet bevel gear and a driven portion connected to the aforesaid worm, and adjustable means for engaging and for disengaging said clutch during each revolution of the meter shaft.

12. An accuracy regulator for forming an operative drive connection between the rotating shaft of a meter and a register where the meter has a range of inaccuracy for which correction is desired, comprising a generally annular casing having an open bottom end adapted to mate with the top of the meter body and an open top end adapted to mate with the bottom of a register, vertical input and output shafts arranged in alignment with one another, a frame on said input shaft, a worm and worm gear carried by said frame, spur gears for connecting the worm gear to the output shaft, a stationary bevel gear fixedly secured to said casing, a planet bevel gear carried by and freely rotatable on said frame and meshing with the aforesaid stationary bevel gear, a clutch having a driving portion connected to said planet bevel gear and a driven portion connected to the aforesaid worm, a throw-in cam for engaging said clutch and a throw-out cam for disengaging said clutch, said cams being disposed within the periphery of the annular casing, one of said cams being stationarily mounted on said casing, the other of said cams being mounted on a movable ring extending about the inside of said casing, and means on said casing affording access to the ring.

13. An accuracy regulator for forming an operative drive connection between the rotating shaft of a meter and a register where the meter has a range of inaccuracy for which correction is desired, comprising a generally annular casing having an open bottom end adapted to mate with the top of the meter body and an open top end adapted to mate with the bottom of a register, vertical input and output shafts arranged in alignment with one another, a frame on said input shaft, a worm and worm gear carried by said frame, spur gears for connecting the worm gear to the output shaft, a stationary bevel gear fixedly secured to said casing, a planet bevel gear carried by and freely rotatable on said frame and meshing with the aforesaid stationary bevel gear, a clutch having a driving portion connected to said planet bevel gear and a driven portion connected to the aforesaid worm, a throw-in cam for engaging said clutch and a throw-out cam for disengaging said clutch, said cams being disposed within the periphery of the annular casing, one of said cams being stationarily mounted on said casing, the other of said cams being mounted on a movable ring extending about the inside of said casing, a movable plate on the side of the casing for access to the ring, a scale on said ring, and a stationary pointer on said casing cooperating with said scale.

14. An accuracy regulator for forming an operative drive connection between the rotating shaft of a meter and a register where the meter has a range of inaccuracy for which correction is desired, comprising a generally annular casing having an open bottom end adapted to mate with the top of the meter body and an open top end adapted to mate with the bottom of a register, vertical input and output shafts arranged in alignment with one another, a frame on said input shaft, a worm and worm gear carried by said frame, spur gears for connecting the worm gear to the output shaft, a stationary bevel gear fixedly secured to said casing, a planet bevel gear carried by and freely rotatable on said frame and meshing with the aforesaid stationary bevel gear, a clutch having a driving portion connected to said planet bevel gear and a driven portion connected to the aforesaid worm, a throw-in cam for engaging said clutch and throw-out cam for disengaging said clutch, said cams being disposed within the periphery of the annular casing, one of said cams being stationarily mounted on said casing, the other of said cams being mounted on a movable ring extending about the inside of said casing, a movable plate on the side of the casing for access to the ring, means to facilitate adjustment of the ring within the casing, and locking means for locking the ring in adjusted position.

15. An accuracy regulator for forming an operative drive connection between the rotating shaft of a meter and a register where the meter has a range of inaccuracy for which correction is desired, comprising a generally annular casing having an open bottom end adapted to mate with the top of the meter body and an open top end adapted to mate with the bottom of a register, vertical input and output shafts arranged in alignment with one another, a frame on said input shaft, a worm and worm gear carried by said frame, spur gears for connecting the worm gear to the output shaft, a stationary bevel gear fixedly secured to said casing, a planet bevel gear carried by and freely rotatable on said frame and meshing with the aforesaid stationary bevel gear, a clutch having a driving portion connected to said planet bevel gear and a driven portion connected to the aforesaid worm, a throw-in cam for engaging said clutch and a throw-out cam for disengaging said clutch, said cams being disposed within the periphery of the annular casing, one of said cams being stationarily mounted on said casing, the other of said cams being mounted on a rotatable ring extending about the inside of said casing, a movable plate on the side of the casing for access to the ring, a scale on said ring, a stationary pointer on said casing cooperating with said scale, and locking means for locking the ring in adjusted position.

16. An accuracy regulator for forming an operative drive connection between the rotating shaft of a meter and a register where the meter has a range of inaccuracy for which correction is desired, comprising a generally annular casing having an open bottom end adapted to mate with the top of the meter body and an open top end adapted to mate with the bottom of a register, vertical input and output shafts arranged in alignment with one another, a frame on said input shaft, a worm and worm gear carried by said frame, spur gears for connecting the worm gear to the output shaft, a stationary gear fixedly secured to said casing, a planet gear carried by said frame and meshing with the aforesaid stationary gear, a clutch having a driving portion connected to said planet gear and a driven portion connected to the aforesaid worm, a throw-in cam for engaging said clutch and a throw-out cam for disengaging said clutch, said cams being disposed within the periphery of the annular casing, one of said cams being stationarily mounted on said casing, the other of said cams being mounted on a ring extending about the inside of said casing, said cams being at different levels of axial position relative to the meter shaft, and means to prevent said cams from opposing one another in diametrically opposite position.

17. An accuracy regulator for forming an operative drive connection between the rotating shaft of a meter and a register where the meter has a range of inaccuracy for which correction is desired, comprising a generally annular casing having an open bottom end adapted to mate with the top of the meter body and an open top end adapted to mate with the bottom of a register, vertical input and output shafts arranged in alignment with one another, a frame on said input shaft, a worm and worm gear carried by said frame, spur gears for connecting the worm gear to the output shaft, a stationary gear fixedly secured to said casing, a planet gear carried by said frame and meshing with the aforesaid stationary gear, a clutch having a driving portion connected to said planet gear and a driven portion connected to the aforesaid worm, a throw-in cam for engaging said clutch and a throw-out cam for disengaging said clutch, said cams being disposed within the periphery of the annular casing, one of said cams being stationarily mounted on said casing, the other of said cams being mounted on a movable ring extending about the inside of said casing, and detent means on the clutch for holding the same in either extreme position.

18. An accuracy regulator for forming an operative drive connection between the rotating shaft of a meter and a register where the meter has a range of inaccuracy for which correction is desired, comprising a generally annular casing having an open bottom end adapted to mate with the top of the meter body and an open top end adapted to mate with the bottom of a register, vertical input and output shafts arranged in alignment with one another, a frame on said input shaft, a worm and worm gear carried by said frame, spur gears for connecting the worm gear to the output shaft, a stationary gear fixedly secured to said casing, a planet gear carried by said frame and meshing with the aforesaid stationary gear, a clutch having a driving portion connected to said planet gear and a driven portion connected to the aforesaid worm, a throw-in cam for engaging said clutch and a throw-out cam for disengaging said clutch, said cams being disposed within the periphery of the annular casing, one of said cams being stationarily mounted on said casing, the other of said cams being mounted on a movable ring extending about the inside of said casing, said cams being at different levels of axial position relative to the meter shaft, and detent means on the clutch for holding the same in either extreme position.

19. An accuracy regulator for forming an operative drive connection between the rotating shaft of a meter and a register where the meter has a range of inaccuracy for which correction is desired, comprising a generally annular casing having an open bottom end adapted to mate with the top of the meter body and an open top end adapted to mate with the bottom of a register, vertical input and output shafts arranged in alignment with one another, a frame on said input shaft, a worm and worm gear carried by said frame, spur gears for connecting the worm gear to the output shaft, a stationary gear fixedly secured to said casing, a planet gear carried by said frame and meshing with the aforesaid stationary gear, a clutch having a driving portion connected to said planet gear and a driven portion connected by a clutch shaft to the aforesaid worm, a throw-in cam for engaging said clutch and a throw-out cam for disengaging said clutch, said cams being disposed within the periphery of the annular casing, one of said cams being stationarily mounted on said casing, the other of said cams being movably mounted in said casing, detent means on the clutch shaft for holding the clutch in either extreme position, and friction means for preventing rotation of the shaft when the shaft is moved to the clutch disengaged position.

CHARLES P. BERGMAN.